United States Patent [19]

von Hagen

[11] 4,419,948

[45] Dec. 13, 1983

[54] NEEDLE BAR LUBRICANT SEALING DEVICE

[75] Inventor: Wolf R. von Hagen, Hemmingen, Fed. Rep. of Germany

[73] Assignee: Union Special G.m.b.H., Stuttgart, Fed. Rep. of Germany

[21] Appl. No.: 376,313

[22] Filed: May 10, 1982

[30] Foreign Application Priority Data

May 16, 1981 [DE] Fed. Rep. of Germany ..... 31195679

[51] Int. Cl.³ .......................................... D05B 71/00
[52] U.S. Cl. .................................. 112/256; 184/6.18; 184/24; 308/5 R
[58] Field of Search ................. 112/256; 184/6.15, 24, 184/25, 6.18; 384/137, 322; 308/5 R, 3 R

[56] References Cited

U.S. PATENT DOCUMENTS

| | | | |
|---|---|---|---|
| 2,580,170 | 12/1951 | Grimmer | 384/137 X |
| 2,657,762 | 11/1953 | Peters | 308/5 R |
| 2,699,843 | 1/1955 | Peters | 184/24 |
| 2,776,173 | 1/1957 | Rudy | 384/137 X |
| 3,773,003 | 11/1973 | Marforio | 112/256 |

*Primary Examiner*—Werner H. Schroeder
*Assistant Examiner*—Andrew M. Falik
*Attorney, Agent, or Firm*—John W. Harbst; John A. Schaerli

[57] ABSTRACT

A needle bar bushing having a lubricant seal for reducing excess lubricant on the needle bar of a sewing machine. The lubricant seal includes a plurality of vertically aligned scraping portions including at least two similarily disposed conical scraping edges situated over a portion of the length of the needle bar bushing. The conical scraping edges being arranged in surrounding engagement with the needle bar for stripping and leading excess lubricant from the peripheral surface of the needle bar thus reducing the danger of lubricant working its way through the bushing and being thrown onto the work being sewn as a result of needle bar reciprocation.

7 Claims, 1 Drawing Figure

NEEDLE BAR LUBRICANT SEALING DEVICE

FIELD OF THE INVENTION

The present invention generally relates to sewing machines and, more particularly, to a sealant means for the needle bar of a sewing machine.

BACKGROUND OF THE INVENTION

The needle bar of a sewing machine is usually guided in a bushing or bearing from which it projects during each reciprocation or stroke. The ever increasing speeds of today's sewing machines require that a sufficient amount of lubricant film be deposited on the reciprocating needle bar to reduce frictional wear with the bushing. Although preferred, intensive lubrication, coupled with the reciprocatory movement of the needle bar, ultimately results in lubricant issuing at the ends of the bearings or bushings. The lubricant issuing at the ends of the bearing can result in excessive lubricant consumption. Balanced against the interest of intensely lubricating the needle bar is the concern that the work being done must be protected such that no lubricant is thrown thereon. Preferably, both of these concerns should be satisfied without dimunition in the effectiveness of the machine, i.e. a shortened needle bar travel. Previous attempts at solving the problems with which the present invention is concerned are illustrated in U.S. Pat. Nos. 3,773,003 and 4,079,685.

SUMMARY OF THE INVENTION

In view of the above, and accordance with the present invention, there is provided a sealant means for a needle bar of a sewing machine which allows for intensive lubrication of the needle bar and its actuating parts and also guards against the issuance of lubricant from the lower distal end of the bushing without any diminution in machine efficiency. This optimum result is accomplished by providing the needle bar bushing with a plurality of aligned scraping portions including at least two conical scraping edges. The scraping edges are situated over a limited length of the bushing and are similarly disposed relative to one another. That is, both conical portions forming the scraping edges extend substantially rectilinearly downward from a high point, which is arranged in surrounding contact or engagement with the needle bar, to the periperhery of the bushing. As a result, a quantity of lubricant is scraped from the periphery of the needle bar on each downward stroke thereof thus resulting in the needle bar carrying only a comparatively thin layer of lubricant.

In its preferred form, the lubricant seal may be further characterized in that the needle bar bushing includes two axially aligned bushings which are disposed over a limited length. Each of the bushings have a frusto-conical end disposed in a substantially similar relationship relative to one another. The conical ends of the bushings serve as the scraping edges and, as such, are situated in surrounding engagement with the needle bar. The first bushing is provided with a radial bore or channel arranged immediately adjacent the conical portion of the second bushing or bearing such that the lubricant removed by the second scraping edge may be lead from the periphery of the needle bar. Means are also provided for mitigating the possibility of workpiece soilage upon return movement of the needle bar.

In line with all of the above, a primary object of this invention is the provision of a needle bar lubricant seal which reduces the excess quantity of lubricant carried by the needle bar in a manner obviating the aforesaid disadvantages.

Another object of the present invention is the provision of a lubricant seal which guards against the dissipation of lubricant onto a workpiece being sewn while providing for adequate lubrication during needle bar reciprocation.

The present invention has for another object to remove lubricant from the periphery of the needle bar in a manner avoiding lubricant accumulation at the lower end of the needle bar bushing.

Still another object of this invention is to locate a needle bar and its actuating parts within an enclosed sewing machine housing having lubrication therefor and wherein said needle bar is guided by a bushing having means disposed thereon so that excess lubricant adhering to the needle bar will be adequately removed therefrom.

Yet another object of this invention is to provide a lubricant seal for the needle bar of a sewing machine which is economical, simple in design, but yet rugged in construction.

BRIEF DESCRIPTION OF THE DRAWING

Having in mind the above objects and other attendant advantages that would be evident from an understanding of this disclosure, the invention comprises the device, combinations, and arrangements of parts as illustrated in the presently preferred form of the invention which is hereinafter set forth in detail so as to enable those skilled in the art to readily understand the function, operation, construction and advantages of same when read in conjunction with the accompanying drawing in which.

DETAILED DESCRIPTION OF THE PRESENT INVENTION

Figure 1:
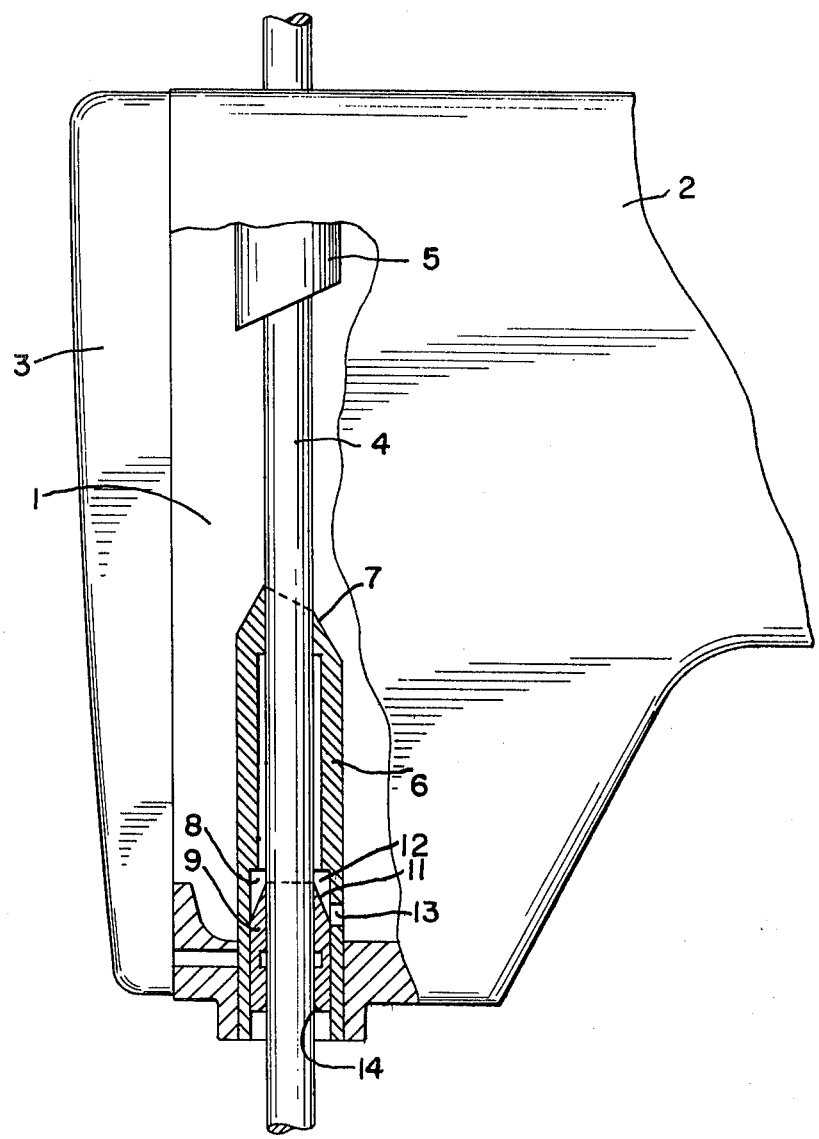
FIG. 1 schematically represents a front elevational view of the head portion of a sewing machine showing the lubricant sealing means embodying this invention.

Referring now to the drawing, there is shown the head end portion of a conventional sewing machine according to the invention. The head end portion includes a sewing head 1 arranged at the free end of an upper arm or bracket 2. The sewing head is formed with a cavity that is closed by a face plate or cover 3 secured to the frame or housing by any suitable means. Vertically extending into the head cavity is a shaft-like needle bar or rod 4 journaled in bushings or bearings 5, 6 for movement along a generally vertical linear path. The bushing 6 is conventionally located in an opening formed in the lower wall of the housing and through which the needle bar extends. Reciprocatory endwise motion is imparted to the needle bar by a conventional driving means (not shown). The needle bar and operating parts therefor operate in a mist of lubricant oil or, in the alternative, may be directly lubricated.

In accordance with this invention, a needle bar lubricant seal is provided which allows intensive needle bar lubrication without lubricating oil appearing in the sewing spaces. The needle bar lubricant seal includes a plurality of vertically aligned lubricant scraping portions including at least two scraping edges 7, 11, both of which maintain a sealing and wiping contact with the rod 4. The scraping edge 7 is provided by a frusto-conical design arranged in surrounding engagement with the needle bar periphery at one end or extremity of the bushing 6. In this manner, the longitudinal bore in the bushing 6 serves as a straight line guide for the needle bar, while the truncated conical surface 7, extending downward and away from the periphery of the needle bar, acts as a scraping edge. As a result, a quantity of lubricant is scraped and led from the needle bar periphery by the scraping edge 7 during the downward stroke of the needle bar.

The second scraping edge 11 of the needle bar lubricant seal is disposed in vertical alignment and in a similar manner to the first scraping edge. The second scraping edge 11 is disposed intermediate the first scraping edge and the opposite extremity of the bushing 6. In the preferred embodiment, the second scraping edge is provided by a second frusto-conical design arranged in surrounding engagement with the needle bar at the end of a second or auxiliary bushing 9. The second bushing is fixedly carried in a widened bore 8 provided at the lower end of bushing 6. In contrast with its upper end, the lower most inner edge 14 of the second other or auxiliary bushing is designed to prevent lubricant removal of the needle bar during the return stroke of same. A rounded edge being the presently preferred form of the lower most inner edge of the bushing. A change may be made in the construction of this lower most end shown in the drawings without departing from the scope of this invention.

As with bushing 6, the longitudinal bore in the bearing or bushing 9 serves as a straight line guide for the needle bar while the truncated conical surface 11, extending downward and away from the needle bar at an angle substantially similar to the angle of the edge 7, acts as a scraping edge. The conical end of bushing 9 forms with the bore 8 a chamber 12 for collecting excessive lubricant stripped from the needle bar. A radial port or channel 13, formed in the bearing 6 and located immediately adjacent the scraping edge 11 allows the lubricant collected in chamber 12 to be drained into the machine chamber. On the downward stroke of the needle bar, the scraping edge 11 is adapted to scrape and lead from the periphery of the needle bar excessive lubricant film, if any, finding its way through the first scraping edge 7.

In operation, the needle bar is said to be given a rectilinear reciprocating motion. The thickness of the lubricant layer on the needle bar periphery is first reduced in the proximate area wherein lubricant is deposited about the rod or shaft. Understandably, the first conical scraping edge permits a sufficient amount of lubricant to remain on the rod for lubricating the intimate contact or guiding portion of the bushing. To insure that a comparatively thin layer of lubricant covers that portion of the needle bar leaving or extending outside the bushing 6, the second conical scraping edge 11 is provided. As mentioned, this second scraping edge is vertically aligned with, is of substantially similar configuration to, and is similarly disposed relative to the first scraping edge. Of course, the second scraping edge permits a relatively thin lubricant layer to remain on the needle bar for lubricating the intimate contact or guiding portion of the auxiliary bushing.

The bushing's frusto-conical surfaces forming the scraping edges allow lubricant to be lead from the periphery of the needle bar. In this manner, lubricant collection or drawing of excessive lubricant into the bushing is efficiently prevented. To accomplish this end, the channel 13 provided in bushing 6 and opening to the machine chamber is provided immediately adjacent the lower end of the second scraping edge to prevent accumulation of lubricant about the periphery of the needle bar. Through this construction of a bushing, the needle bar and actuating parts therefor may operate in an intensively lubricated area without any danger of the lubricant working through the bushing and being thrown onto the workpiece as a result of the reciprocation of the needle bar.

Means are further provided for mitigating the possibility of lubricant soilage of the workpiece upon the return stroke of the needle bar. That is, during its return stroke, the removal of lubricant from the needle bar by the auxiliary bushing may be prevented by proper design of the lower most edge 14 of the auxiliary bushing. In this manner, any residual lubricant serving to lubricate the contact areas of the bushing is allowed into the bushing upon the return stroke of the needle bar. Should lubricant accumulate normally, such excessive lubricant will be removed by the scraping edges upon the downward stroke of the needle bar.

Thus there has been provided a Needle Bar Sealing Device for a Sewing Machine which fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

Thus, having adequately described my invention, what I claim is:

1. A sewing machine comprising:
    a frame;
    a bearing secured in the frame;
    a lubricated needle bar endwise reciprocally mounted in said bearing for movement along a generally vertical linear path;
    means for removing excess lubricant from the peripheral surface of said needle bar, said means comprising first and second scraping edges arranged in surrounding engagement with said needle bar both of which are formed by an upper edge of a truncated conical surface which tapers downwardly and away from the straight line path of the needle bar, said first scraping edge being situated at one extremity of said bearing and the second scraping edge being situated intermediate the first scraping edge and the opposite extremity of said bearing, and a radial part formed in said bearing in communication with one of said scraping edges.

2. A sewing machine comprising:
    a housing;
    a lubricated needle bar adapted for endwise reciprocation along a generally vertical linear path and extending through a wall of the housing;
    said needle bar being located in a bushing which closes an opening in the wall through which said needle bar extends, said bushing being provided with a plurality of scraping portions including at least two vertically aligned scraping edges surrounding the needle bar, both of said edges being substantially rectilinear and disposed at substantially similar angles extending downward and away from the vertical linear path of said needle bar, said bushing further includes a radial port positioned in registry with one of said scraping edges.

3. Apparatus for reducing excessive lubricant on a reciprocating lubricated shaft-like member, said apparatus comprising:
a cylindrical guide means adapted to slideably receive said shaft-like member, said cylindrical guide having at least two similarly disposed conical scraping edges sloping in substantially the same direction and in surrounding contact with the shaft-like member and a channel arranged in communication with one of said scraping edges for directing excess lubricant from said shaft-like member.

4. Device for reducing excess lubricant from a lubricated rod adapted for reciprocation along a linear path, said device comprising:
a cylindrical guide means adapted to slideably receive said lubricated rod, said cylindrical guide having a plurality of scraping portions including at least two conical scraping edges arranged in surrounding engagement with said rod, each of said conical scraping edges sloping in substantially the same direction and being similarly disposed relative to the linear path of said rod for stripping and leading excessive lubricant from the peripheral surface of said rod.

5. A sewing machine comprising:
a closed housing;
a lubricated needle bar extending through a wall of closed housing and adapted for reciprocal motion;
a first bushing fixedly secured in the housing for guiding said needle bar, said first bushing having at one end at least one conical lubricant scraping surface arranged in surrounding engagement with said needle bar;
a second bushing fixedly carried at the other end of said first bushing, said second bushing having a conical lubricant scraping surface similar to said other conical scraping surface and in surrounding engagement with said needle bar whereby said scraping surfaces direct and effectuate removal of excessive lubricant from the needle bar periphery when said needle bar moves in one direction.

6. The invention according to claim 5 wherein said second bushing is designed to prevent lubricant from being scraped from said needle when it moves in the other direction.

7. A sewing machine having a housing, a stitch forming instrumentality including a needle bar adapted for endwise reciprocation in said housing, and a lubricant sealing device for said needle bar, said lubricant sealing device comprising:
a bushing through which said needle bar intimately extends, said bushing being provided with a plurality of lubricant scraping portions including at least two conical scraping edges operatively associated with the periphery of the needle bar, said scraping edges being disposed at substantially similar angles relative each other, said bushing further including a channel opening to said housing and arranged immediately adjacent to one of said conical scraping edges.

* * * * *